United States Patent [19]

Revankar

[11] Patent Number: 4,954,058

[45] Date of Patent: Sep. 4, 1990

[54] METHOD FOR MAKING COMPOSITE SINTERED APEX SEAL MATERIAL

[75] Inventor: Gopal S. Revankar, Moline, Ill.

[73] Assignee: Deere & Company, Moline, Ill.

[21] Appl. No.: 471,195

[22] Filed: Jan. 25, 1990

Related U.S. Application Data

[62] Division of Ser. No. 211,732, Jun. 27, 1988.

[51] Int. Cl.$^5$ .............................................. B22F 1/00
[52] U.S. Cl. ...................................... 419/18; 419/38; 419/60; 75/240
[58] Field of Search ............................. 419/18, 38, 60

[56] References Cited

U.S. PATENT DOCUMENTS

| | | | |
|---|---|---|---|
| 3,909,310 | 9/1975 | Uy | 148/11.5 |
| 3,981,062 | 9/1976 | Moskowitz et al. | 29/182.7 |
| 4,011,054 | 3/1977 | Beyer et al. | 29/182.7 |
| 4,032,302 | 6/1977 | Nakamura et al. | 75/240 |
| 4,101,318 | 7/1978 | Rudy | 75/240 |
| 4,129,444 | 12/1978 | Dreyer et al. | 75/251 |

FOREIGN PATENT DOCUMENTS 1236709  5/1988  Canada .

OTHER PUBLICATIONS

Chemical Abstracts, Bunch 75, No. 24, Dec. 13, 1971, 142503, "Solid Lubrication for Aero Propulsion Systems".

*Primary Examiner*—Stephen J. Lechert, Jr.
*Assistant Examiner*—Nina Bhat

[57] ABSTRACT

A apex seal is formed by cold pressing and sintering a mixture of Clevite and tungsten carbide powders to form a seal wherein harder rounded carbide particles are distributed within a softer matrix.

6 Claims, 3 Drawing Sheets

METHOD FOR MAKING COMPOSITE SINTERED APEX SEAL MATERIAL

This application is a division of application Ser. No. 07/211,732, is now pending, filed Jun. 27, 1988.

BACKGROUND OF THE INVENTION

The present invention relates to a sintered composite material, particularly for use as an apex seal in a rotary internal combustion engine.

Apex seals in rotary engines are subject to rapid wear due to high operating pressures and temperatures, high relative speeds between the seals and the running surface, and difficult or insufficient lubrication between contacting surfaces. These conditions are even more severe in a stratified charge rotary internal combustion engine. Various apex seal materials have been proposed for use in conventional rotary engines. For example, as described in U.S. Pat. No. 4,144,003, apex seals for rotary engines have been made from the known seal material, sintered "Clevite 300". However, such conventional "Clevite" seals have been found to have unacceptable wear rates in the environment of a stratified charge rotary engine.

In U.S. Pat. No. 4,011,054, a seal or wear strip contains a sintered material based on a mixture of powered iron, powered vanadium carbide and other carbides. It is stated that rounded vanadium carbide particles are formed in a matrix of other material. For various reasons, this seal material has not been utilized commercially in significant quantities. One reason appears to be that powdered vanadium carbide is so expensive that seals utilizing vanadium carbide would not be commercially practicable. Furthermore, vanadium carbide has a hardness which is too high and too variable, with the result that the vanadium carbide particles in such sealing strips may cause severe wear in the surface against which the seals slide. Accordingly, a commercially practicable wear-resistant apex seal is desired.

SUMMARY OF THE INVENTION

An object of the present invention is to provide an apex seal which is resistant to wear in a stratified charge rotary combustion engine.

This and other objects are achieved according to the present invention which provides an apex seal formed from a mixture of a powdered material known as Clevite 300 and a powdered mixture of tungsten carbide and cobalt. These two mixtures are themselves mixed together, cold pressed in a mold approximately the size and shape of an apex seal and then vacuum sintered to produce an apex seal which has hard rounded or non-angular carbide particles distributed in a softer matrix.

BRIEF DESCRIPTION OF THE DRAWINGS

FIG. 4b is a graphical representation of a coefficient of friction measured during the wear rig test associated with FIGS. 3b and 4a.

DETAILED DESCRIPTION

According to the present invention, powdered Celvite 300 seal material is mixed together with a mixture of powdered tungsten carbide (WC) and cobalt (Co). Clevite 300 is a known material patented by the Clevite Corporation and consists of (by weight) approximately 70% iron (Fe), 15% molybdenum (Mo) and 15% Cobalt (Co) and is further described in detail in U.S. Pat. No. 3,052,954, which is hereby incorporated by reference herein.

The WC/Co mixture is known as Amdry 927 produced by Alloy Metals Inc. or 72F-NS produced by Metco, Inc. and consists (by weight) of approximately 88% tungsten carbide and 12% cobalt. These two mixtures are preferably combined and mixed at a ratio (by weight) of 70 to 30, Clevite to WC/Co. The resulting mixture will then consist by weight of approximately 49% iron, 26.4% tungsten carbide, 14.1% cobalt and 10.5% molybdenum.

This resulting mixture is then cold die pressed at 40–45 tons per square inch in a mold to produce the conventional shape of an apex seal. The seal material is then vacuum sintered for approximately 3 hours in $10^{-4}$ to $10^{-5}$ Torr of air or 1 to 2 p.s.i. of Argon at a temperature of 1200–1225 degrees Celcius.

An optional step is to then hot isostatically press "HIP" the seal at 1100 degrees Celcius for approximately one hour at 15,000 psi argon pressure.

Figure 1:
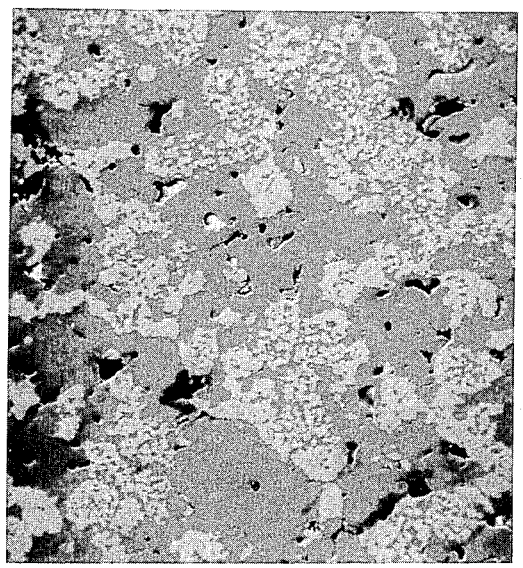
FIG. 1 is a photomicrograph (magnification X200) showing the structure of seal material according to the present invention sintered at 1200 degrees Celcius.

FIG. 1 shows the microstructure of a seal material which was sintered at 1200 degrees Celcius, resulting in rounded precipitated carbide particles. At sintering temperatures, greater than approximately 1225 degrees Celcius, angular precipitated carbide particles are produced. In a 30% by weight Clevite mixture sintered at 1200 degrees Celcius or more, the Clevite phase appears to form a lower melting point eutectic liquid at the interface with the carbide particles. At temperatures in the 1200–1225 degree Celcius range, it appears that the newly formed carbides correspond to the original WC particles, except that their composition and shape are altered due to solid-liquid interface diffusion of Clevite matrix elements (mostly Fe, Mo and a small amount of Co). (There is evidence that tungsten diffuses from the carbide phase into the matrix). It is believed that the cobalt improves the seal's sliding characteristic at high temperatures.

Figure 2:
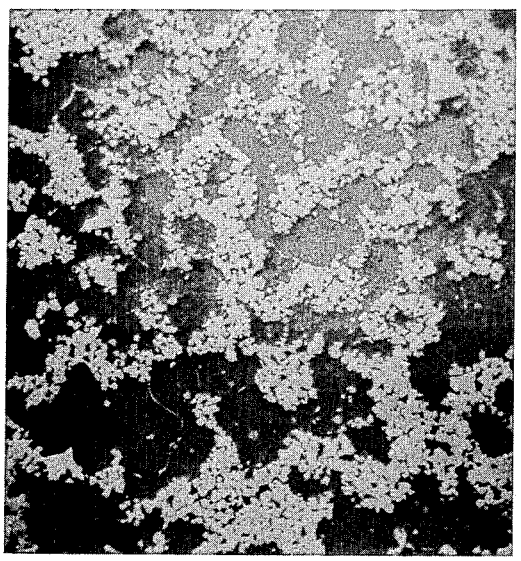
FIG. 2 is a photomicrograph (magnification X200) showing the structure of seal material of FIG. 1, but sintered at 1250 degrees Celcius.

The newly formed particles tend to take on spherical shapes due to the surface tension of the boundary liquid. If, however, the temperature of sintering is higher than 1200 degrees Celcius, the amount of liquid phase can be larger and the original WC particle will be completely dissolved in the liquid and upon cooling, will precipitate as angular complex carbide crystals. A sintering temperature of 1250 degrees Celcius was found to be marginal for the 30% WC composite since the microstructure produced a mixture of both the rounded and the angular precipitates (see FIG. 2).

It is believed that the formation of new carbides takes place during the initial 60 minutes. The sintering time is extended beyond 60 minutes to achieve better sintering of the matrix. The 1200 degree Celcius temperature appears to be lower than required to produce a fully dense Clevite matrix since the sintered mass has considerable porosity, and hence the need to HIP the seal. It is believed that this HIP cycle does not change the shape or distribution of the carbides, but results in improved density (9.4 gm/cc). The density of one sample material which was not HIP processed was found to be 7.7 gm/cc indicating the amount of porosity was 18.1 percent is compared to the sample which was HIP processed.

Apex seals formed according to this invention were wear-tested in the unHIPed condition on a test rig wherein the apex seal was run against the inner surface of a rotating cylinder or ring with a 9.5 inch inside diameter. The inner surface of the cylinder was coated with a conventional "D-Gun" LW-15 tungsten carbide coating provided by Union Carbide and was lubricated with Stauffer's SDL-1 lubricant. The cylinder rpm, the test duration and the radially outward load on the seal was varied as follows:

| RUN # | RING RPM | LOAD KG/CM | DURATION, MIN |
|---|---|---|---|
| 222 | 1000 | 4.0 | 120 |
| 223 | 1350 | 2.5 | 120 |
| " | " | 4.0 | 180 |
| 224 | " | 6.0 | 120 |
| " | " | 8.0 | 180 |
| 225 | 2000 | 0.89 | 5 |
| " | " | 4.0 | 10 |
| " | " | 6.0 | 10 |
| 226 | " | 4.0 | 300 |
| 227 | " | 8.0 | 12 |
| " | " | 8.0 | 60 |

During these tests, there was no scuffing between the seal and the inner ring surface, there were no abrupt temperature fluctations and there was no measurable seal height loss except in Run #227 when the height loss corresponded to 0.010 inches per 100 hours. For comparison, a pure Clevite seal was run against LW-IN30 at 2000 ring RPM and 8 kg/cm load (in a test similar to run #227 above). The Clevite seal did not last more than 30 seconds.

Figure 3A:
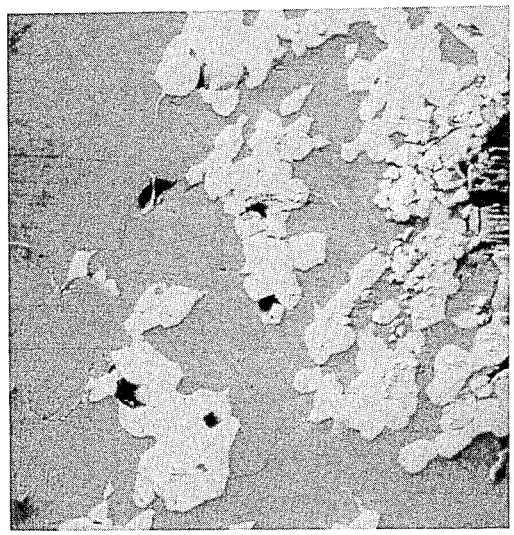
FIG. 3a is a photomicrograph (magnification X1000) showing the seal material of the present invention before the seal was subject to a wear rig test.
Figure 3B:
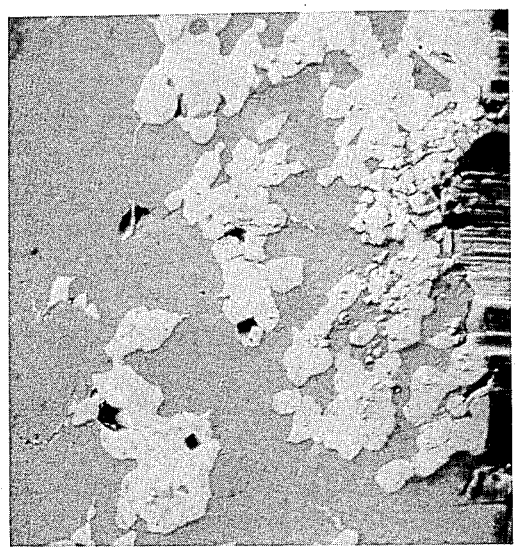
FIG. 3b is a photomicrograph (magnification X1000) showing the same seal material surface as in FIG. 3a after the seal was subjected to a wear rig test.
Figure 4A:
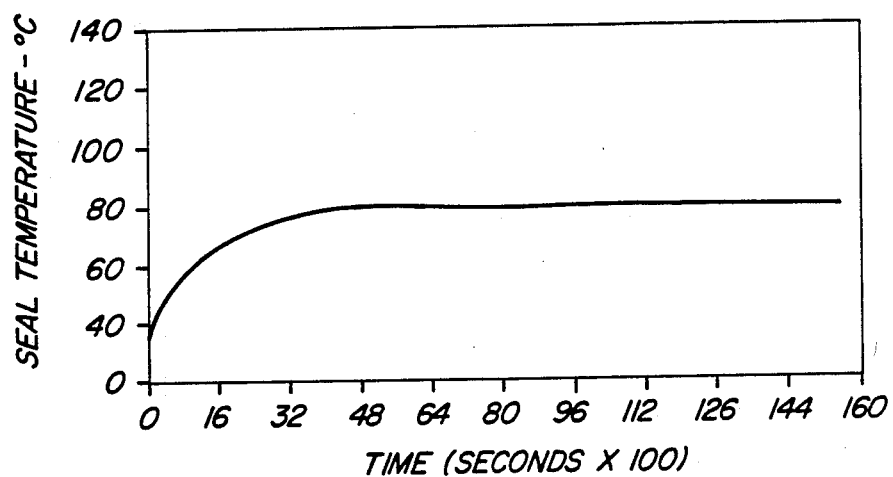
FIG. 4a is a graphical representation of seal temperature (degrees Celcius) versus time (seconds) measure during the wear rig test associated with FIG. 3b.
Figure 4B:
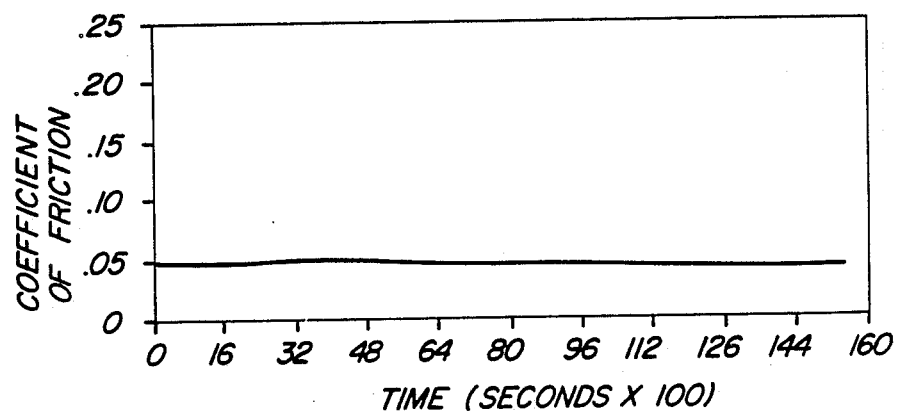

Another seal was tested for 4.5 hours at 1000 ring RPM, 8 kg/cm load against LW-15 and the seal surface was found to have no abrasive wear (see FIGS. 3a and 3b). It is believed that the contact load was mostly borne by the carbide particles which are resistant to abrasion due to their high hardness and their ability to retain high hardness at higher sliding contact surface temperatures. The tendency for abrasion is also reduced since the carbides in the seal surface and the coating have nearly the same hardness. The clevite matrix helps to minimize the adhesive tendency at the seal/coating interface. The seal temperature and coefficient of friction plots for this test are shown in FIGS. 4a and 4b.

While the invention has been described in conjunction with a specific embodiment, it is to be understood that many alternatives, modifications and variations will be apparent to those skilled in the art in light of the aforegoing description. For example, it should be possible to cold press (in a die) or cold isostatically press (in a mold) the above described powder mixture in the form of larger billets, and hot press or hot isostatically press (HIP) them to sinter and form dense composite solids at temperatures lower than 1200 degrees Celcius and then reheat the solids to develop the desired microstructures under controlled conditions of temperature, pressure, time and environment. Or, the powder mixture may be directly HIPed at temperatures lower than 1200 degrees Celcius in sealed cans and then reheated to develop suitable microstructures under controlled conditions. Accordingly, this invention is intended to embrace all such alternatives, modifications and variations which fall within the spirit and scope of the appended claims.

I claim:

1. A method of making a wear resistant member comprising sintering a mixture of: (a) tungsten carbide particle and cobalt; and (b) a molybdenum, iron and cobalt alloy to form a sintered body containing more non-angular tungsten carbide particles than before sintering.

2. A method of making a wear resistant member according to claim 1 wherein said mixture is cold pressed into a desired shape and vacuum sintered.

3. A method of making a wear resistant member according to claim 2 wherein said sintering is for a time of from 3 to 6 hours at a temperature between 1150–1250° C.

4. A method of making a wear resistant member according to claim 3 wherein said mixture of tungsten carbide and cobalt contains 88% by weight tungsten carbide, 12% by weight cobalt.

5. A method of making a wear resistant member according to claim 4 wherein the molybdenum iron and cobalt alloy contains 5–20% by weight molybdenum, 5–20% by weight cobalt, balance essentially iron.

6. A method of making a wear resistant member according to claim 5 wherein the molybdenum, iron and cobalt alloy contains 15% by weight molybdenum, 15% by weight cobalt, balance essentially iron.

* * * * *